UNITED STATES PATENT OFFICE.

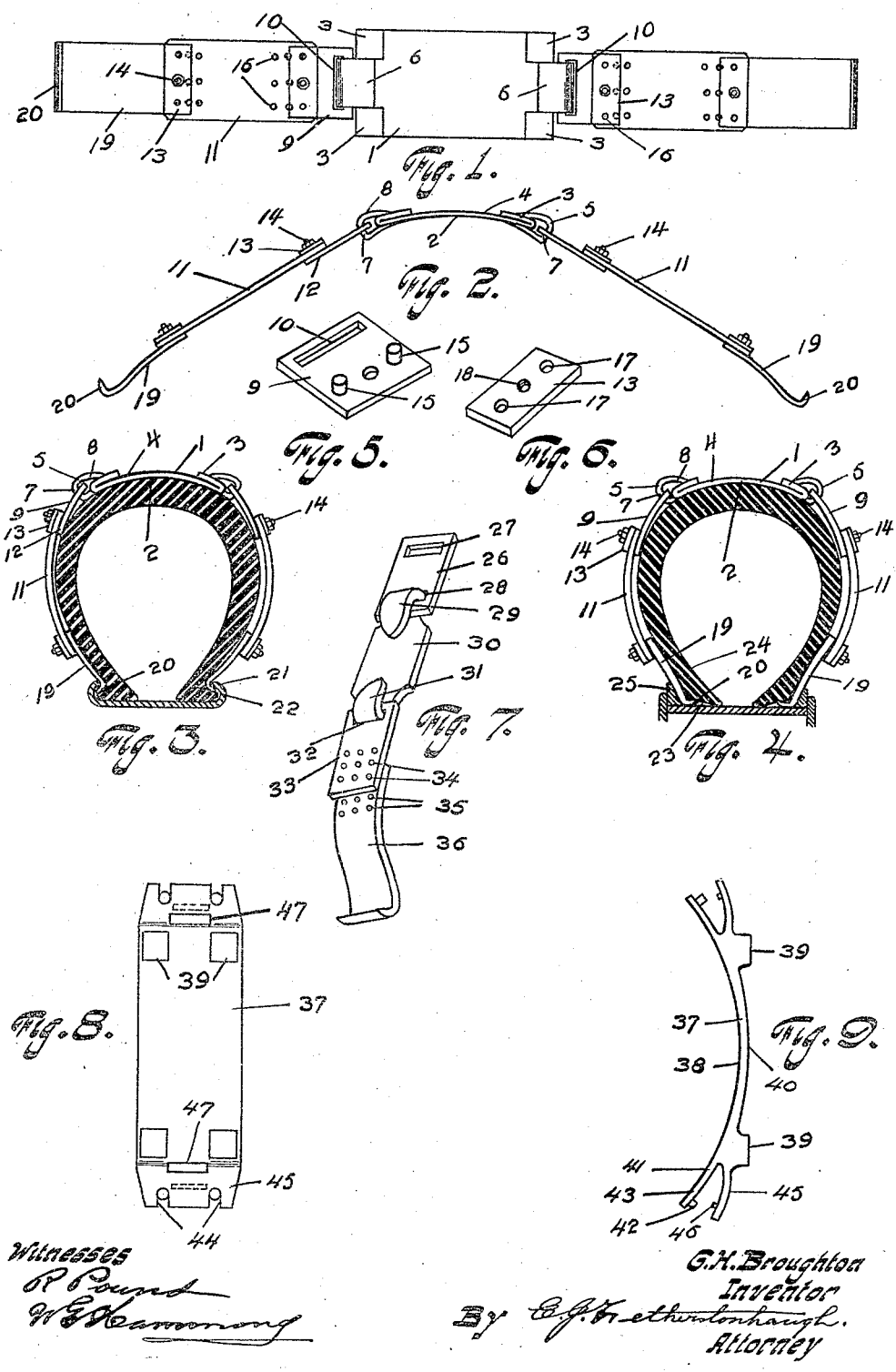

GEORGE HENRY BROUGHTON, OF TORONTO, ONTARIO, CANADA.

TIRE-PROTECTOR.

1,293,322.  Specification of Letters Patent.  Patented Feb. 4, 1919.

Application filed April 19, 1915. Serial No. 22,474.

*To all whom it may concern:*

Be it known that I, GEORGE HENRY BROUGHTON, a subject of the King of Great Britain, and resident of 176 Montrose Ave., in the city of Toronto, county of York, Providence of Ontario, in the Dominion of Canada, have invented certain new and useful Improvements in Tire-Protectors, of which the following is a specification.

The invention relates to improvements in tire protectors as described in the present specification and shown in the accompanying drawings that form part of the same.

The invention consists essentially of the novel means employed whereby a plurality of metal tread plates are transversely arranged over the outer surface of the tire and are secured to the wheel rim and in the novel construction of said tread plates.

The objects of the invention are to prevent the skidding of vehicles, to prolong the life of the tires and generally to provide a non-skidding device which will be cheap to manufacture, durable and efficient.

In the drawings, Figure 1 shows the device with the securing or clasping ends extending.

Fig. 2 shows a side elevation of the device with the securing or clasping ends partially extended.

Fig. 3 shows a section of the ordinary clencher type of tire with the device attached.

Fig. 4 shows the ordinary universal or straight wall type of tire with the device attached.

Fig. 5 is a detail of one of the adjusting plates.

Fig. 6 is a detail view of the other of the adjusting plates.

Fig. 7 shows a modified form of securing or clasping end.

Fig. 8 shows a modified form of tread plate.

Fig. 9 shows a side view of the tread plate shown in Fig. 8.

Like numerals of reference indicate corresponding parts in each figure.

Referring to the drawings, 1 is a metal plate having the concaved under side 2 and the upwardly or outwardly extending bosses 3 adjacent to the ends of said plate, said bosses being formed by a portion of the metal of the plate being bent upwardly from the surface 2 and then returned onto the surface 4 where it may be secured by the process of spot welding or other means if necessary.

5 are loops formed at each end of the plates 2 by the centrally disposed portions 6 of metal 6, by being bent upwardly from the surface 3 in such a way that the wall 7 of the loop 5 will form as nearly as possible an angle of 90 degrees with the surface 3 at the point of bending.

8 are the upper or closing ends of the loops 5 and are so formed that their top or highest point will be in the same plane as the top or highest point of the bosses 3, the upper surfaces of which are in the same plane as the central part of the plate 1, thus giving an even bearing surface to the tread plate and at the same time increasing the effectiveness as a non-skidding device.

9 are metal links adapted to be secured to each end of the plate 1 by means of the loops 5 of the plate 1 coming into engagement with the slotted openings 10 in the ends of the said links.

11 are flexible links of fabric or leather engaging the ends 12 of the links 9 and being securely held thereto between said links 9 and the metal plate 13 by means of one or more screws or bolts 14 passing through all of the said parts.

15 are bosses extending upwardly from the upper surface of the links 9 and being adapted to pass through suitable openings 16 in the flexible links 11 and to enter corresponding openings 17 in the plate 13 and thus securely lock the links 9, the links 11 and the metal plates 13 together.

18 is a screw threaded opening in the plate 13 adapted to engage the screw or bolt 14 when the parts are assembled.

19 are metal hooks attached to the outer ends of the flexible links 11 similarly to the manner in which said links 11 are connected to the links 9, said hooks having the outwardly extending ends 20 bent inwardly and being adapted to grip the rim of the wheel at 21 and being secured thereto by the expansion of the tire 22.

In Fig. 4 the device is shown attached to the straight wall tire by simply reversing the clasps 19 so that the extending ends 20 are directed inwardly as shown when they will engage the underside 23 of the tire 24 and be held thereto by the metal wall 25 of the wheel rim.

In Fig. 7 a modification of the securing ends is shown in which an all metal device is employed. The links 26 having the slots 27 adapted to engage the loops 5 of the plate 1 and also the slots 28 adapted to engage the loop 29 of the links 30.

31 are similar loops at the other end of the links 30 engaging the slots 32 of the links 33.

34 are suitable openings through the links 33 adjacent to the outer ends thereof and being adapted to engage corresponding openings 35 in the clasps 36 and form together an adjustable means of fastening the said links 33 and clasps 36 by means of screws or bolts through said openings.

In Figs. 8 and 9 a cast metal tread plate 37 is shown having the concaved under surface 38 and the upwardly extending bosses 39, the top of said bosses being in the same plane as the central portion 40 of the plate 37.

41 are the ends of the plate 37, said ends being substantially fork shape and having from the lower wall 43 thereof the upwardly extending bosses or teeth 42, said teeth being adapted to engage the slots 44 of the upper members 45 of the forked ends 41 when the leather or fabric is in place and the members 43 and 45 are closed thereon.

46 is a downwardly extending boss from the under surface of the member 45 said boss serving as an extra means of securing the leather or fabric when the members 43 and 45 are closed.

47 is a slot in the member 45 adjacent to the point of bending to facilitate the closing and opening of the members 43 and 45.

In the use of the invention the tread plates are placed transversely over the outer surface of the tire at suitable distances from each other and the clasps on each end of the device locked to the wheel rim thus forming a series of interchangeable tread plates around the tire.

It is apparent that by placing the tread pieces closely together the tire will be completely covered thus affording protection against blow outs and prolonging the life of the tire.

What I claim is:

A tire protector comprising a series of plates hinged together and having a hook member at each end of the series and a central tread plate, the tread plate being curved in the direction of its length and having its ends split to form three tongues at each end, two of which are folded back against the plate to give lateral tread surfaces approximately at the same level as the center part of the plate and the third bent to form an eye for pivotal engagement with the adjacent plate of the protector.

Signed at the city of Toronto, Ontario, this fourth day of March, 1915.

GEORGE HENRY BROUGHTON.

Witnesses:
W. G. HAMMOND,
R. POUND.

Copies of this patent may be obtained for five cents each, by addressing the "Commissioner of Patents, Washington, D. C."